US006921855B2

(12) United States Patent
Tanaka

(10) Patent No.: US 6,921,855 B2
(45) Date of Patent: Jul. 26, 2005

(54) ANALYSIS PROGRAM FOR ANALYZING ELECTRONIC MUSICAL SCORE

(75) Inventor: Kyoko Tanaka, Kagoshima (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 10/379,893

(22) Filed: Mar. 6, 2003

(65) Prior Publication Data

US 2003/0177887 A1 Sep. 25, 2003

(30) Foreign Application Priority Data

Mar. 7, 2002 (JP) ....................................... 2002-061758

(51) Int. Cl.$^{7}$ .......................... G09B 15/00; G09B 15/02

(52) U.S. Cl. .................. 84/477 R; 84/483.1; 84/483.2; 84/609

(58) Field of Search .................. 84/600–602, 609–610, 84/649–650, 470 R, 477 R, 478, 483.1, 483.2, 484, 485 R, DIG. 6

(56) References Cited

U.S. PATENT DOCUMENTS 4,704,682 A * 11/1987 Clynes ........................ 84/622
5,864,631 A * 1/1999 Shutoh ....................... 382/113
5,952,597 A * 9/1999 Weinstock et al. ............ 84/609
6,107,559 A * 8/2000 Weinstock et al. ............ 84/634
6,235,979 B1 * 5/2001 Yanase ..................... 84/477 R
6,545,208 B2 * 4/2003 Hiratsuka .................... 84/476
2002/0118562 A1 * 8/2002 Hiratsuka ...................... 365/1

* cited by examiner

*Primary Examiner*—Marlon Fletcher
(74) *Attorney, Agent, or Firm*—Oblon, Spivak, McClelland, Maier & Neustadt, P.C.

(57) ABSTRACT

An analysis programs, apparatus, and method is provided for analyzing electronic musical scores. The invention relates to analyzing an electronic musical score that designates a desired musical note sequence in electronic musical score data, extracts a musical note sequence similar to the desired musical note sequence, and displays the extracted musical note sequence so as to be distinguishable from other musical notes. The analysis apparatus and program for analyzing the electronic musical designates a designated musical note sequence in the electronic musical score data to be analyzed. A first calculation provides a calculation of the designated differential sequence of the designated musical note sequence and a second calculation calculates differential sequences of the original musical note sequences in the electronic musical score data. An extracting step of extracting a musical note sequence having a differential sequence with a predetermined similarity index with respect to the designated differential sequence of the designated musical note sequence from among the differential sequences of the original musical note sequences in the electronic musical score data is obtained. Next, the extracted musical note sequence is provided with accessory information visually distinguishable from the other musical note sequences, wherein displaying step displays the musical note in a color in accordance with the accessory information.

18 Claims, 14 Drawing Sheets

FIG. 10

| | |
|---|---|
| DESIGNATED MUSICAL NOTE SEQUENCE | C D E F D E C G |
| DIFFERENTIAL SEQUENCE (MUSICAL INTERVAL PROVIDED WITH POSITIVE OR NEGATIVE SIGN) | 2 2 2 -3 2 -3 5 |

| | |
|---|---|
| ORIGINAL DIFFERENTIAL SEQUENCE | 2 2 2 -3 2 -3 5 |
| CONTRARY DIFFERENTIAL SEQUENCE | -2 -2 -2 3 -2 3 -5 |

FIG. 12

| START ADDRESS | END ADDRESS | COLOR |
|---|---|---|
| 10 | 16 | BLUE |
| 21 | 27 | BLUE |
| 33 | 39 | LIGHT BLUE |
| ⋮ | ⋮ | ⋮ |

ANALYSIS PROGRAM FOR ANALYZING ELECTRONIC MUSICAL SCORE

BACKGROUND OF THE INVENTION

1. Field of the Invention

The present invention relates to analysis programs, analysis apparatuses, and analysis methods for analyzing electronic musical scores. More particularly, the present invention relates to an analysis program, an analysis apparatus, and an analysis method for analyzing an electronic musical score that designate a desired musical note sequence in electronic musical score data, extract a musical note sequence similar to the desired musical note sequence, and display the extracted musical note sequence so as to be distinguishable from other musical notes.

2. Description of the Related Art

A musical score information display apparatus, which is disclosed, for example, in Japanese Unexamined Patent Application Publication No. 2001-100740, is known as an apparatus for displaying an electronic musical score in a standard musical score data format such as a Standard MIDI File (SMF).

As apparatuses for assisting or supporting the play and practice of a musical instrument when this type of musical score information display apparatus is used, an apparatus in which the size, color, and intensity of an electronic musical note on the display are changed in response to the strength of its musical sound (disclosed in, for example, Japanese Unexamined Patent Application Publication No. 2001-100738) and an apparatus in which musical notes in a part that is difficult to play or that should be paid attention are displayed in a different color (disclosed in, for example, Japanese Unexamined Patent Application Publication No. 7-311543) are known.

In the musical score information display apparatuses of such conventional types, however, the strength of musical sound and the musical notes in the part that should be paid attention are merely displayed in such a manner that only they are distinguishable. Thus, a player should determine the difference between these musical notes and other musical notes while looking at the displayed electronic musical score. Therefore, the player cannot theoretically or structurally understand the musical notes that are displayed so as to be visually distinguishable from the other musical notes in terms of an image of the entire musical piece. Thus, it is hard for the player to understand an image of the entire musical piece and the player's performance is not so improved.

SUMMARY OF THE INVENTION

Accordingly, it is an object of the present invention to provide an analysis program, an analysis apparatus, and an analysis method for analyzing an electronic musical score in which a player can visually understand a music structure and an image of the entire musical piece and in which the player's performance can thus be improved in a short period of time.

In order to achieve the above-mentioned object, according to a first aspect of the present invention, a computer-executable analysis program for analyzing an electronic musical score disclosed which is executed by a computer to cause the computer for carrying out the steps including a reading step of reading electronic musical score data; a first calculating step of calculating a designated differential sequence of a designated musical note sequence in the electronic musical score data; a second calculating step of calculating differential sequences of original musical note sequences to be analyzed in at least part of the read electronic musical score data; an extracting step of extracting a musical note sequence having a differential sequence with a predetermined similarity index with respect to the designated differential sequence of the designated musical note sequence from among the differential sequences of the original musical note sequences in the electronic musical score data; and a providing step of providing accessory information to visually distinguish the extracted musical note sequence from the other musical notes.

According to a second aspect of the present invention, an analysis apparatus for analyzing an electronic musical score includes an electronic musical score data reading unit for reading electronic musical score data; a musical note sequence designating unit for designating a designated musical note sequence in the electronic musical score data read by the electronic musical score data reading unit; a first differential sequence calculating unit for calculating a designated differential sequence of the designated musical note sequence; a second differential sequence calculating unit for calculating differential sequences of original musical note sequences to be analyzed in at least part of the electronic musical score data read by the electronic musical score data reading unit; a musical note sequence extracting unit for comparing each of the differential sequences calculated in the second differential sequence calculating unit with the designated differential sequence calculated in the first differential sequence calculating unit and extracting a musical note sequence having a differential sequence with a predetermined similarity index; an accessory information providing unit for providing the musical note sequence extracted in the musical note sequence extracting unit with accessory information that is visually distinguishable from the other musical note sequences; and a displaying unit for displaying the thus processed electronic musical score data.

According to a third aspect of the present invention, an analysis method for analyzing an electronic musical score includes a designating step of designating a designated musical note sequence in electronic musical score data to be analyzed; a first calculating step of calculating a designated differential sequence of the designated musical note sequence; a second calculating step of calculating differential sequences of original musical note sequences in the electronic musical score data to be analyzed; an extracting step of extracting a musical note sequence having a differential sequence with a predetermined similarity index with respect to the designated differential sequence of the designated musical note sequence from among the differential sequences of the original musical note sequences in at least part of the electronic musical score data to be analyzed; and a providing step of providing the extracted musical note sequence with accessory information that is visually distinguishable from the other musical note sequences.

In the analysis program, analysis apparatus, and analysis method for analyzing the electronic musical score according to the present invention, for example, a musically characteristic musical note sequence in the electronic musical score data to be analyzed is designated and a designated differential sequence of the designated musical note sequence is calculated. Prior to, at the same time with, or after this calculation, differential sequences of original musical note sequences in the electronic musical score data to be analyzed are calculated. A musical note sequence having a differential sequence with a predetermined similarity index with respect to the designated differential sequence of the designated musical note sequence is extracted from among the differential sequences of the original musical note sequences. The extracted musical note sequence is provided with the accessory information that is visually distinguishable from the other musical note sequences.

Displaying the thus processed electronic musical score data on the displaying unit allows a musical note sequence highly correlated with the designated musical note sequence designated by the player to be visually distinguished from the other musical note sequences, thus allowing the player to visually understand the structure of the entire musical piece. Consequently, the player's performance of the designated musical note sequence is improved, which causes the player's performance of the entire musical piece to be improved in a short period of time.

The significance of terms used in the present invention will be described.

The designated musical note sequence in the present invention is not particularly limited. The player can choose any musical note sequence. In particular, more advantages of the present invention can be achieved by designating, for example, a musically characteristic musical note sequence such as a main subject, a counter subject, a main motif, and a counter motif in polyphony music (ex. fugue), or a first subject (Theme I) and a second subject (Theme II) in a sonata movement.

The differential sequence of the musical note sequence in the present invention includes a value representing a pitch difference between two adjacent notes in the musical note sequence. In particular, a rising interval in which one note is higher than the previous note in the music playing direction can be represented by a value with a positive sign, and a falling interval in which one note is lower than the previous note in the music playing direction can be represented by a value with a negative sign.

Here, the musical interval means an interval between two adjacent notes and is expressed numerically. For example, the musical interval sequence of the musical note sequence of "C, D, E, D, and C" is expressed as "major 2nd, ma 2nd, ma 2nd, and ma 2nd". All musical intervals such as a perfect interval, a major interval, a minor interval, an augmented interval, a diminished interval, and the like are included in the present invention. In contrast, a musical interval provided with the positive or negative sign is expressed by the positive value for the rising interval in which one note is higher than the previous note in the music playing direction or by the negative value for the falling interval in which one note is lower than the previous note in the music playing direction. In other words, the order of the musical notes is also considered in the musical interval provided with the positive or negative sign. For example, the musical interval sequence provided with the positive or negative sign (differential sequence) of the musical note sequence of "C, D, E, D, and C" is expressed as "ma 2nd, ma 2nd, −ma 2nd, and −ma 2nd".

In comparing the designated differential sequence of the designated musical note sequence with each of the differential sequences of the original musical note sequences and analyzing them, a differential sequence approximately similar or parallel to the designated differential sequence of the designated musical note sequence (hereinafter, referred to as an original (including "parallel" "augmentation", and "diminution") differential sequence) can be extracted. Instead of or together with the original differential sequence, a differential sequence approximately contrary (inverted or retrograded) to the designated differential sequence of the designated musical note sequence (hereinafter, referred to as a contrary (including "inversion" and "retrogradation") differential sequence) can be extracted. The contrary differential sequence is a differential sequence of the musical note sequence that is approximately contrary to the designated differential sequence of the designated musical note sequence on the musical score. In other words, the contrary differential sequence is a differential sequence whose numeric values are same as those in the designated differential sequence of the designated musical note sequence and whose signs of the respective values are opposite to those in the designated differential sequence of the designated musical note sequence. Not only the musical note sequence having the original differential sequence but also the musical note sequence having the contrary differential sequence is highly musically correlated with the designated musical note sequence.

The above-described differential sequence including the musical interval with the positive or negative value is used in extracting the differential sequence similar or parallel to the designated differential sequence of the designated musical note sequence. In extracting the differential sequence similar or parallel to the designated differential sequence of the designated musical note sequence, a correspondence rate of the designated differential sequence of the designated musical note sequence and each of the differential sequences of the original musical note sequences is determined in order to obtain the similarity index thereof. A musical note sequence having a differential sequence of a correspondence rate more than or equal to a designated threshold is extracted.

Similarly, the differential sequence including the musical interval with the positive or negative value is used in extracting the differential sequence contrary to the designated differential sequence of the designated musical note sequence. In extracting the differential sequence contrary to the designated differential sequence of the designated musical note sequence, a correspondence rate of values obtained by multiplying values in the designated differential sequence of the designated musical note sequence by −1 and values in each of the differential sequences of the original musical note sequences or a correspondence rate of the values in the designated differential sequence of the designated musical note sequence and values obtained by multiplying the values in each of the differential sequences of the original musical note sequences by −1 (in other words, positive or negative signs of the respective values in either of the designated differential sequence of the designated musical note sequence or the differential sequence of the original musical note sequence are changed but the respective numeric values are not changed) is determined in order to obtain the similarity index thereof. A musical note sequence having a differential sequence of a correspondence rate more than or equal to a designated threshold is extracted. The values in the designated differential sequence of the designated musical note sequence may be multiplied by −1. Alternatively, the values in each of the differential sequences of the original musical note sequences may be multiplied by −1.

Although the visually distinguishable accessory information according to the present invention is not particularly limited, the accessory information may include color information or tone information of the musical note or the background of the musical note on the display unit.

In the present invention, the accessory information by which the extracted musical note sequence can be distinguished from the other musical note sequences is provided.

Since the accessory information is provided for visually distinguishing the extracted musical note sequence and the other musical note sequences, providing the accessory information to the extracted musical note sequence, providing the accessory information to the unextracted musical note sequence, and providing the accessory information to both the extracted musical note sequence and the unextracted musical note sequence are within the scope of the present invention.

BRIEF DESCRIPTION OF THE DRAWINGS

FIG. 10 is an illustration of an example of a differential sequence according to the present invention;

FIG. 12 is an illustration schematically showing an example of a display property file according to the present invention;

DESCRIPTION OF THE PREFERRED EMBODIMENTS

The embodiments of the present invention will now be described with reference to the drawings.

Figure 1:
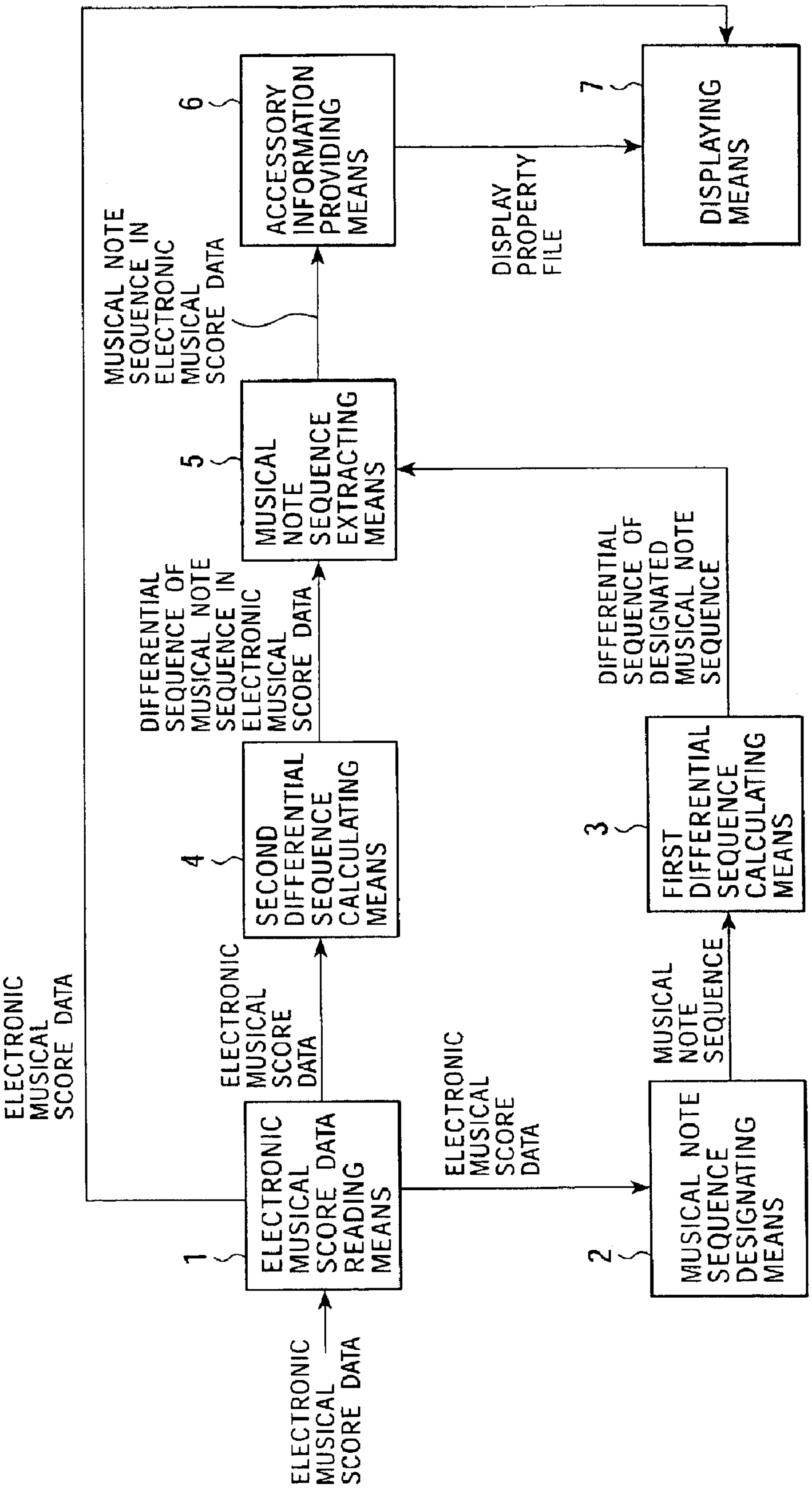
FIG. 1 is a block diagram of an analysis apparatus for analyzing an electronic musical score according to an embodiment of the present invention.

FIG. 1 is a block diagram showing an analysis apparatus for analyzing an electronic musical score according to an embodiment of the present invention. FIGS. 2 to 7 are flowcharts showing data processing steps performed in the analysis apparatus. FIGS. 8 to 13 are illustrations for explaining the analysis apparatus. The analysis apparatus, an analysis program, and an analysis method according to the present invention will now be described based on the data processing steps in the analysis apparatus for analyzing the electronic musical score.

Referring to FIG. 1, the analysis apparatus for analyzing the electronic musical score includes electronic musical score data reading means 1 for reading the electronic musical score data. The electronic musical score data used in the embodiment is written in Musical Instrument Digital Interface (MIDI) format. The electronic musical score data in MIDI format is supplied to the electronic musical score data reading means 1, for example, from a recording medium such as a compact disc or via a network communication link. In this case, the electronic musical score data reading means 1 may be arranged as an interface for a disc drive or a communication link. Alternatively, the read electronic musical score data may be temporarily stored into a hard disc.

The electronic musical score data in MIDI format includes sequence data composed of event data including a note (pitch)-on event, a note-off event, a note number, and velocity, timing data showing time intervals of the event data, and end data. In the analysis program, analysis apparatus, and analysis method for analyzing the electronic musical score according to the present invention, the electronic musical score data is not limited to MIDI format data. Other format data, such as Moving Picture Experts Group (MPEG) data, may also be used in the analysis program, analysis apparatus, and analysis method for analyzing the electronic musical score according to the present invention.

The electronic musical score data read by the electronic musical score data reading means 1 is sent to musical note sequence designating means 2 and second differential sequence calculating means 4.

The musical note sequence designating means 2 designates a desired musical note sequence in the electronic musical score data sent from the electronic musical score data reading means 1. The musical note sequence designating means 2 in the embodiment includes a display which displays the input electronic musical score data and an input device such as a mouse or a keyboard for designating the desired musical note sequence in the musical score on the display.

Figure 8:
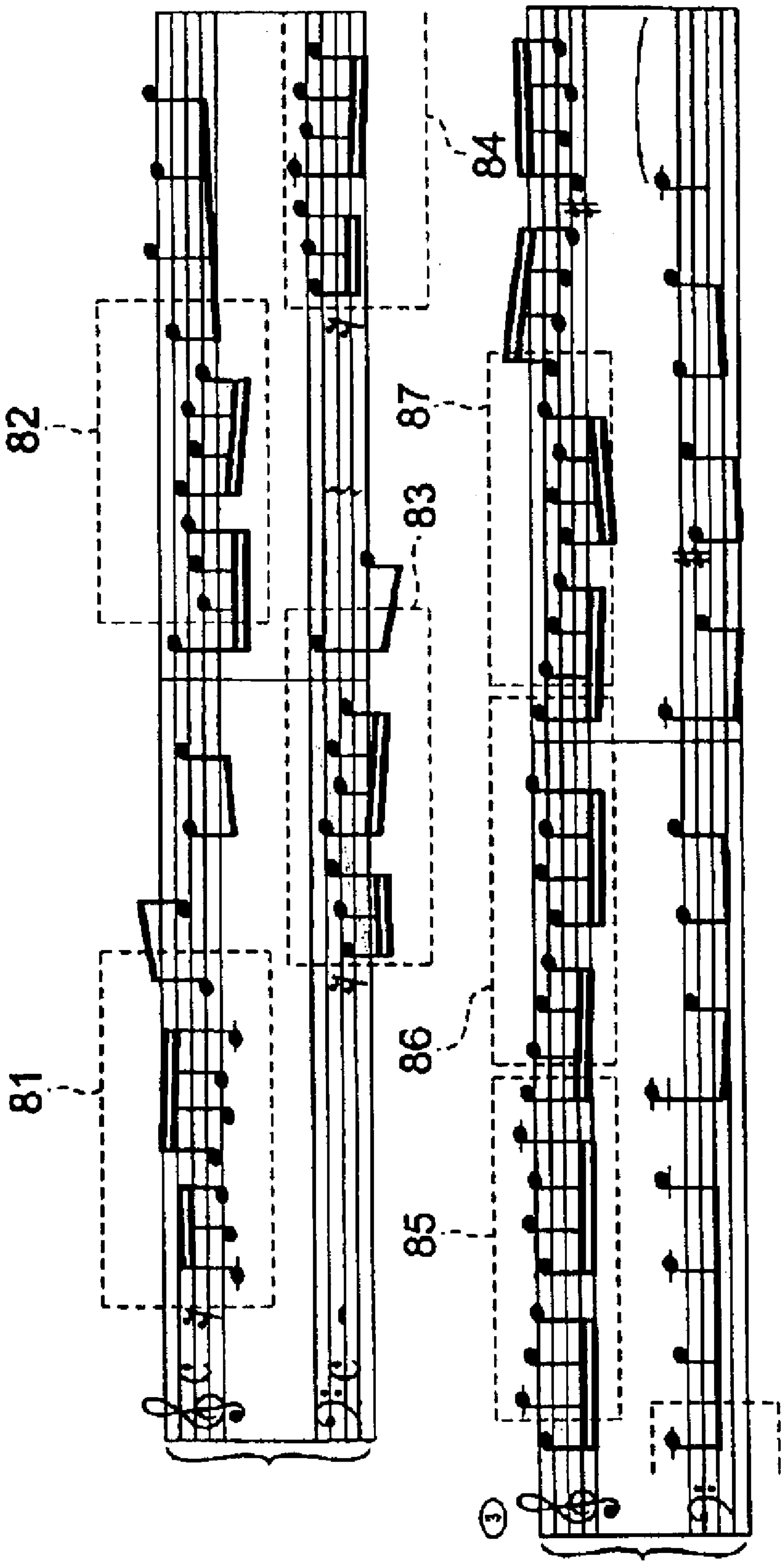
FIG. 8 is an illustration of an example of a musical score for explaining the present invention.
Figure 9:
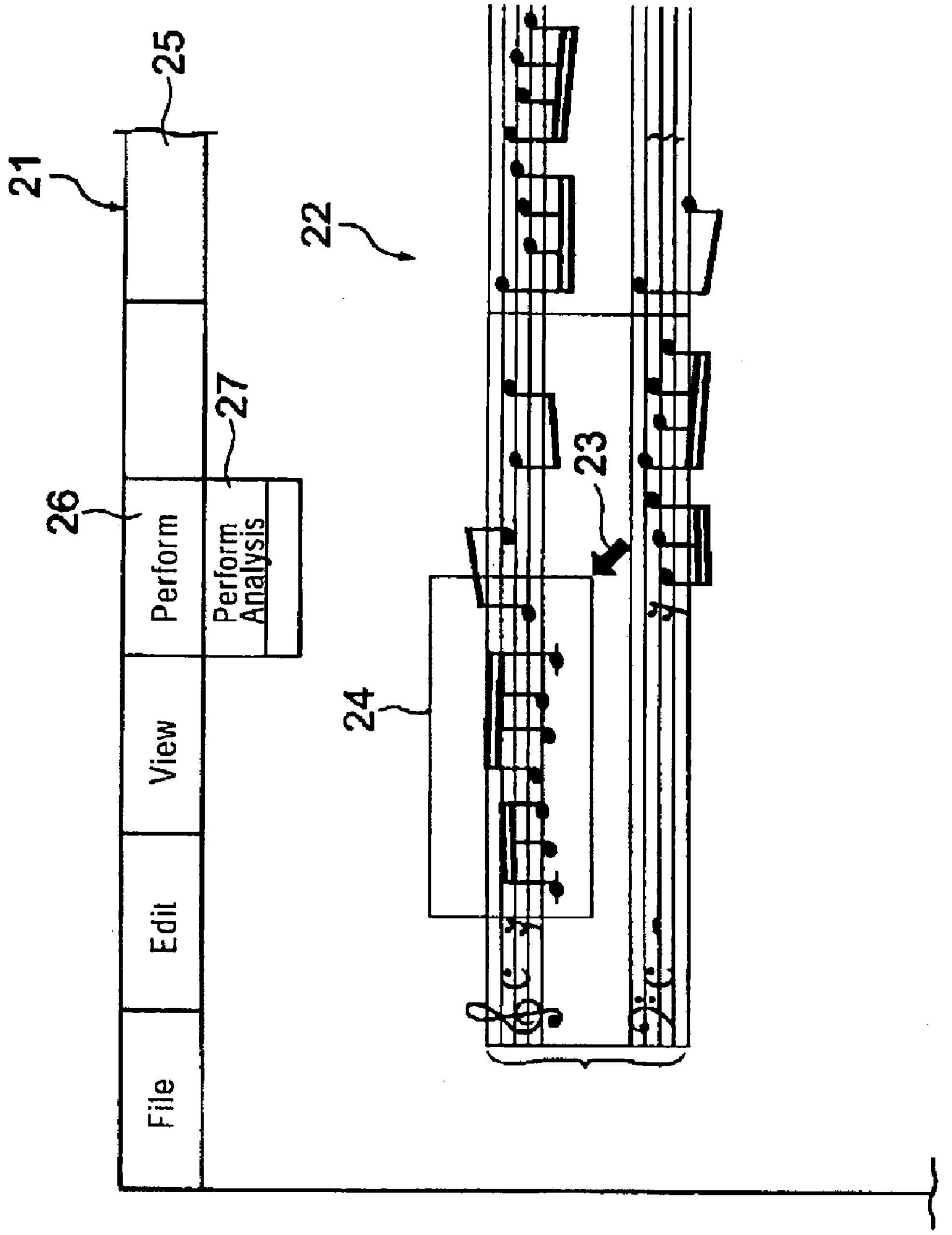
FIG. 9 is an illustration of an example of a display screen in steps S3 and S4 in FIG. 2.

The processing in the musical note sequence designating means 2 will now be described with reference to FIGS. 8 and 9. FIG. 8 shows a part of a musical score for "Invention No. 1" by J. S. Bach and this is used as an example of music in the embodiment. FIG. 9 shows a musical score 22 in the electronic musical score data displayed on a display screen 21. A player designates a desired musical note sequence 24 with a pointer 23 controlled by a mouse or a keyboard. In FIG. 9, eight notes of "C, D, E, F, D, E, C, and G", are designated by the player.

The designated musical note sequence designated by the musical note sequence designating means 2 and including the eight notes of "C, D, E, F, D, E, C, and G", as shown in FIG. 9, is sent to first differential sequence calculating means 3 together with its sequence data. The sequence data is data for indicating the order of the musical notes in the musical note sequence as well as pitches of the musical notes. For example, the sequence data indicates that the first note is "C", the second note is "D", and the third note is "E", as shown in FIG. 9. The term "musical note sequence" used in the present invention means the order of musical notes in the musical note sequence as well as pitches of the musical notes.

The first differential sequence calculating means 3 calculates a differential sequence of the designated musical note sequence designated by the musical note sequence designating means 2. The first differential sequence calculating means 3 functions as an arithmetic unit such as a CPU. The first differential sequence calculating means 3 performs its function by opening a "perform" menu 26 on a menu bar 25 on the display screen 21 and clicking a "perform analysis" button 27 with the mouse.

The differential sequence in the embodiment includes a value with a positive or negative sign that shows the musical interval between two adjacent musical notes in the musical note sequence. For example, if the designated musical note sequence is "C, D, E, F, D, E, C, and G", as shown in FIG. 9, the first value of the differential sequence is the musical interval from the first note to the second note, which is represented by "+2". Similarly, the second value of the differential sequence is the musical interval from the second note to the third note, which is represented by "+2". In contrast, the fourth value of the differential sequence is the musical interval from the fourth note to the fifth note, which is represented by a negative value, "−3". Generally, musical interval is expressed in the unit degree which shows the interval of two adjacent pitches and the order of the notes is not considered in the musical interval. The differential sequence used in the embodiment, however, includes data on the order of the notes. The data is a value which is expressed by a positive (+) value for a rising interval in which one note is higher than the previous note or which is expressed by a negative (−) value for a falling interval in which one note is lower than the previous note. The use of such a differential sequence enables "original" and "contrary" musical note sequences to be readily extracted.

Referring to FIG. 10, the differential sequence calculated in the first differential sequence calculating means 3 is "2, 2, 2, −3, 2, −3, and 5". In the present invention, the differential sequence calculated in the first differential sequence calculating means 3 will be referred to as a differential sequence of the designated musical note sequence, in order to distinguish this from the differential sequence calculated in the second differential sequence calculating means 4.

The second differential sequence calculating means 4 calculates differential sequences of original musical note sequences to be analyzed in the electronic musical score data read by the electronic musical score data reading means 1. The second differential sequence calculating means 4 functions as an arithmetic unit such as a CPU. The second differential sequence calculating means 4 performs its function by clicking the "perform analysis" button 27 on the display screen 21 shown in FIG. 9 with the mouse. The first differential sequence calculating means 3 and the second differential sequence calculating means 4 calculate the respective differential sequences at the same time. Similarly to the differential sequence calculated in the first differential sequence calculating means 3, the differential sequence calculated in the second differential sequence calculating means 4 includes a value with a positive or negative sign that shows the musical interval between two adjacent musical notes. In other words, the differential sequence includes data on the order of the notes. The data is a value which is expressed by a positive (+) value for a rising interval in which one note is higher than the previous note or which is expressed by a negative (−) value for a falling interval in which one note is lower than the previous note, as described above. In the present invention, the differential sequence calculated in the second differential sequence calculating means 4 will be referred to as a differential sequence of the original musical note sequence, in order to distinguish this from the differential sequence calculated in the first differential sequence calculating means 3.

Musical note sequence extracting means 5 compares the differential sequence calculated in the first differential sequence calculating means 3 with the differential sequence calculated in the second differential sequence calculating means 4 and extracts a musical note sequence having a differential sequence with a predetermined similarity index. The musical note sequence extracting means 5 functions as an arithmetic unit such as a CPU.

In the embodiment, in comparison of the differential sequence of the designated musical note sequence calculated in the first differential sequence calculating means 3 with the differential sequence of the original musical note sequence calculated in the second differential sequence calculating means 4, an original musical note sequence and a contrary musical note sequence can be extracted. The "original" musical note sequence has the same number of notes and the same differential sequence as the designated musical note sequence designated in the musical note sequence designating means 2. The "contrary" musical note sequence has the same number of notes as the designated musical note sequence designated in the musical note sequence designating means 2, but signs of the values of the "contrary" musical note sequence are opposite to the signs of the corresponding values of the designated musical note sequence designated in the musical note sequence designating means 2.

For example, referring to FIG. 10, the differential sequence of the designated musical note sequence of "C, D, E, F, D, E, C, and G" shown in FIG. 9 is "2, 2, 2, −3, 2, −3, and 5". In this case, the original differential sequence is "2, 2, 2, −3, 2, −3, and 5", and the contrary differential sequence is "−2, −2, −2, 3, −2, 3, and −5". Any musical note sequence having such differential sequences is regarded as an original or contrary musical note sequence, regardless of the pitches.

For example, referring to FIG. 8, for a designated musical note sequence 81 of "C, D, E, F, D, E, C, and G", a musical note sequence 82 of "G, A, B, C, A, B, G, and D" is an original musical note sequence and a musical note sequence of "A, G, F, E, G, F, A, and D" is a contrary musical note sequence. Although the last note in a musical note sequence 85 of "A, G, F, E, G, F, A, and G" is "G" not "D", the musical note sequence 85 may be regarded as the musical note sequence contrary to the designated musical note sequence 81. A similarity threshold will be described below.

Such original and contrary musical note sequences are highly correlated with the designated musical note sequence. Thus, extracting the original and contrary musical note sequences allows the player to play the musical note sequences in a similar manner as the designated musical note sequence and to understand the image of the entire musical piece.

In comparison of the differential sequence of the designated musical note sequence calculated in the first differential sequence calculating means 3 with the differential sequence of the original musical note sequence calculated in the second differential sequence calculating means 4, the musical note sequence extracting means 5 extracts a musical note sequence having some similarity with the designated musical note sequence, as well as the musical note sequence completely corresponding to the designated musical note sequence. The similarity threshold is selected on a screen for "setting similarity" 51 shown in FIG. 11, together with designation for the original and contrary musical note sequences and for the color. The screen for "setting similarity" 51 is displayed, for example, when the player clicks the "perform analysis" button 27 on the display screen 21 for the electronic musical score data shown in FIG. 9.

Figure 11:
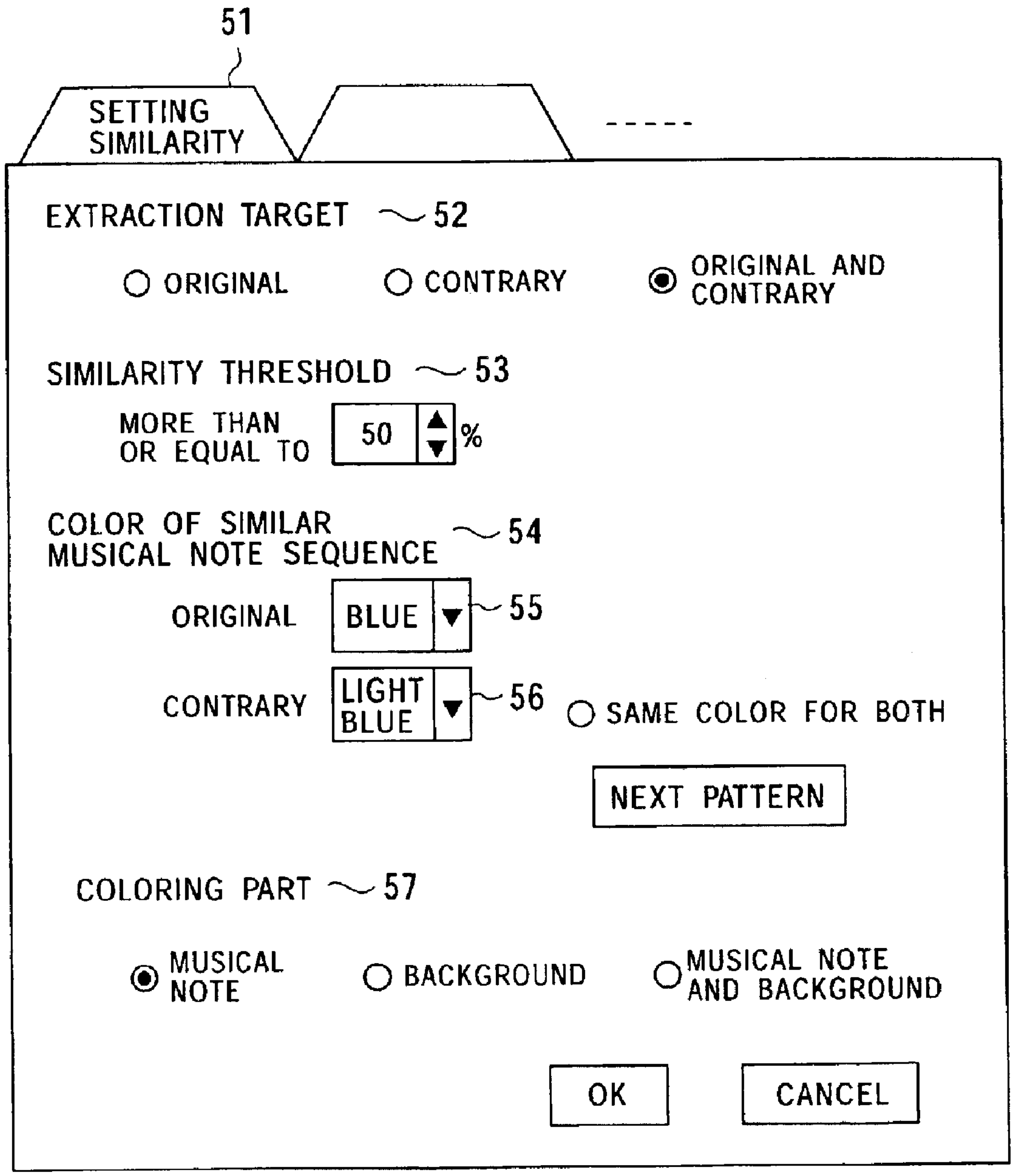
FIG. 11 is an illustration of an example of the display screen in step S7 in FIG. 2.

Referring to FIG. 11, in a designation field for "extraction target" 52, the player selects whether original musical note sequence, contrary musical note sequence, or both the original and contrary musical note sequences is extracted by clicking a radio button. In a designation field for "similarity threshold" 53, the player selects a threshold in percentage. For selection of a threshold of 50% or more, as shown in FIG. 11, if the differential sequence of the designated musical note sequence is "2, 2, 2, −3, 2, −3, and 5", a differential sequence whose similarity index is 50% or more is extracted. More specifically, in this case, since the differential sequence of the designated musical note sequence includes seven values, a differential sequence in which four or more values correspond to the values in the differential sequence of the designated musical note sequence in consideration of the order of the values is extracted, and a differential sequence in which three or less values correspond to the values in the differential sequence of the designated musical note sequence is not extracted. For example, since the differential sequence of the musical note sequence 85 in FIG. 8 is "2, 2, 2, −3, 2, −3, and 2", six values among seven values correspond to the values in the differential sequence of the designated musical note sequence. Thus, the musical note sequence 85 in FIG. 8 is determined to be similar to the designated musical note sequence. In contrast, when a differential sequence of a musical note sequence is "2, 2, 2, −2, −2, 3, and 3", only three values among seven values correspond to the values in the differential sequence of the designated musical note sequence. Thus, this differential sequence is determined to be not similar to the designated musical note sequence.

The player can designate the threshold. Although the threshold is set to 50% in FIG. 11, this is merely an example. Although a higher similarity threshold causes only musical note sequences having high correlation to be extracted, the number of musical note sequences extracted may be reduced; that may be of less practical use. In contrast, although a lower similarity threshold causes the number of the musical note sequences extracted to be increased, musical correlation between the designated musical note sequence and the extracted musical note sequence is weaker. Consequently, the similarity threshold should be selected depending on the music.

Referring now back to FIG. 1, the musical note sequence extracted in the musical note sequence extracting means 5 is sent to accessory information providing means 6. The accessory information providing means 6 provides the musical note sequence extracted in the musical note sequence extracting means 5 with accessory information in order to visually distinguish the extracted musical note sequence from unextracted musical note sequences. In the embodiment, the accessory information providing means 6 creates a display property file and sends it with the electronic musical score data to displaying means 7. FIG. 12 schematically shows the display property file.

An address and a color on the electronic musical score data of the musical note sequence extracted by the musical note sequence extracting means 5, that is, the musical note sequence highly correlated with the designated musical note sequence are recorded in the display property file shown in FIG. 12 in such a manner that the address corresponds to the color. The address is based on the data sent from the musical note sequence extracting means 5 and the color is designated by the player on the screen for "setting similarity" 51 shown in FIG. 11. The player designates colors for "original musical note sequence" 55 and "contrary musical note sequence" 56 and the like in a designation field for "color of similar musical note sequence" 54. In a designation field for "coloring part" 57, the player selects a part to be colored in the color designated in the designation field for "color of similar musical note sequence" 54 from among the musical note, the background of the musical note, and both the musical note and background.

Figure 13:
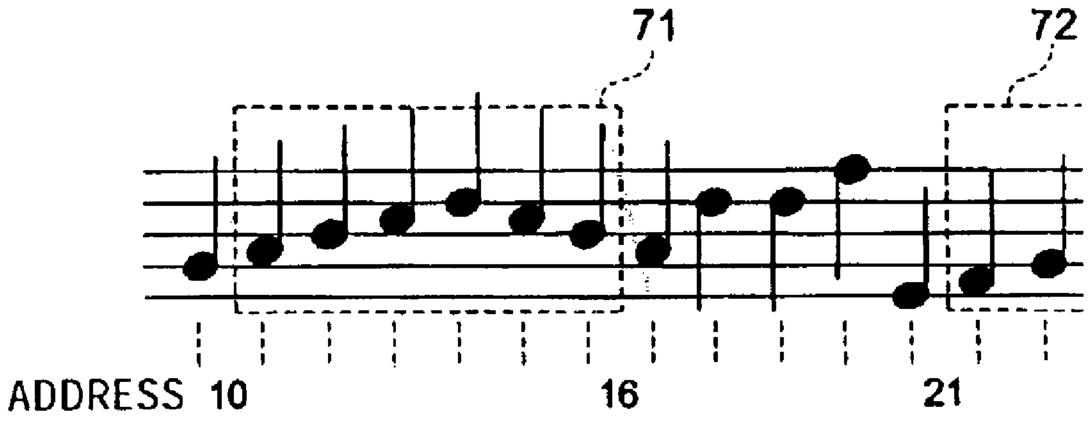
FIG. 13 is an illustration of an example of the display screen in steps S9 and S10 in FIG. 2.

The above-described display can be used in the displaying means 7. The displaying means 7 displays the musical score in accordance with the display property file received from the accessory information providing means 6 and the electronic musical score data received from the electronic musical score data reading means 1. Then, the musical note sequence extracted by analysis is colored. FIG. 13 is an illustration showing the electronic musical score displayed on the display in accordance with the display property file shown in FIG. 12. In FIG. 13, six notes in a musical note sequence 71 corresponding to note addresses 10 to 16 are displayed in a blue color. Similarly, six notes in a musical note sequence 72 corresponding to note addresses 21 to 27, part of which is shown in FIG. 13, are displayed in a blue color.

Although the display property file created in the accessory information providing means 6 is directly sent to the displaying means 7 to display the electronic musical score data in the embodiment, the present invention is not limited to this. A case in which the display property file created in the accessory information providing means 6 and the electronic musical score data are stored in the recording medium and displayed by other displaying means is also included in the scope of the present invention.

The overall process of the data processing steps will now be described with reference to FIGS. 2 to 7.

The default is set in the screen for "setting similarity" 51 shown in FIG. 11. In the designation field for "extraction target" 52, a target for analysis and extraction is selected from among the original musical note sequence, the contrary musical note sequence, and both the original and contrary musical note sequences. In the designation field for "similarity threshold" 53, a threshold for extraction is designated. In the designation field for "color of similar musical note sequence" 54, respective colors for the original musical note sequence and the contrary musical note sequence are designated. In the designation field for "coloring part" 57, the coloring part is selected from among the musical note, the background of the musical note, and both the musical note and the background of the musical note.

Figure 2:
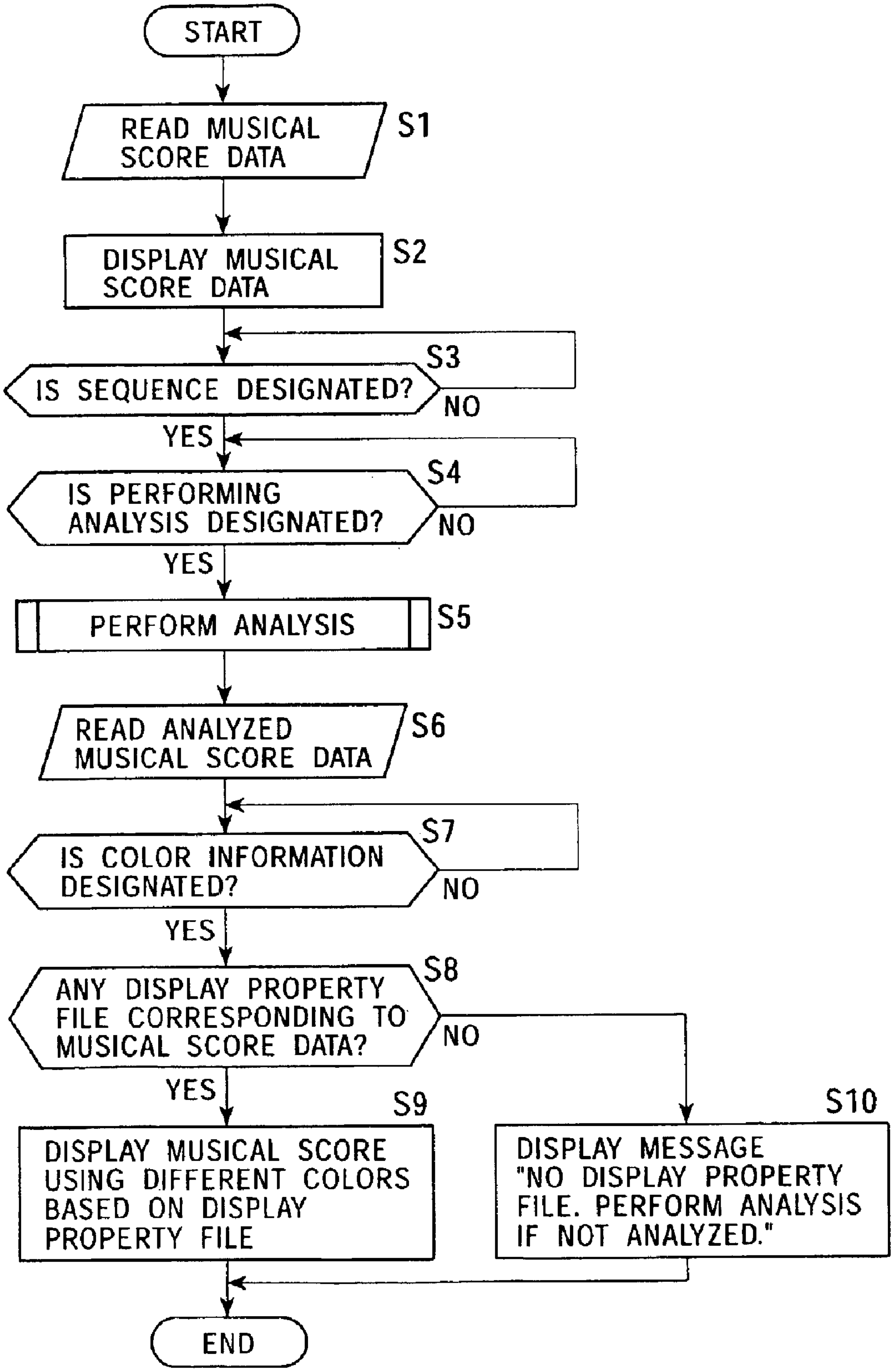
FIG. 2 is a main flowchart of steps in the analysis apparatus for analyzing the electronic musical score according to the present invention.

Referring to FIG. 2, in step S1, the electronic musical score data is read into the electronic musical score data reading means 1 from the recording medium or via the communication link. In step S2, the musical score 22 in the read electronic musical score data is displayed on the display screen 21, as shown in FIG. 9. Then, the musical note sequence designating means 2 designates the desired musical note sequence (step S3). For example, the theme or the like of the music is designated as the desired musical note sequence. The desired musical note sequence is, however, not particularly limited to this. Any part can be designated depending on;a purpose of using the analyzed results.

The player designates the desired musical note sequence 24 with the pointer 23, as shown in FIG. 9. The player clicks the "perform analysis" button 27 with the mouse (step S4) to start the analyzing process (step S5).

Figure 3:
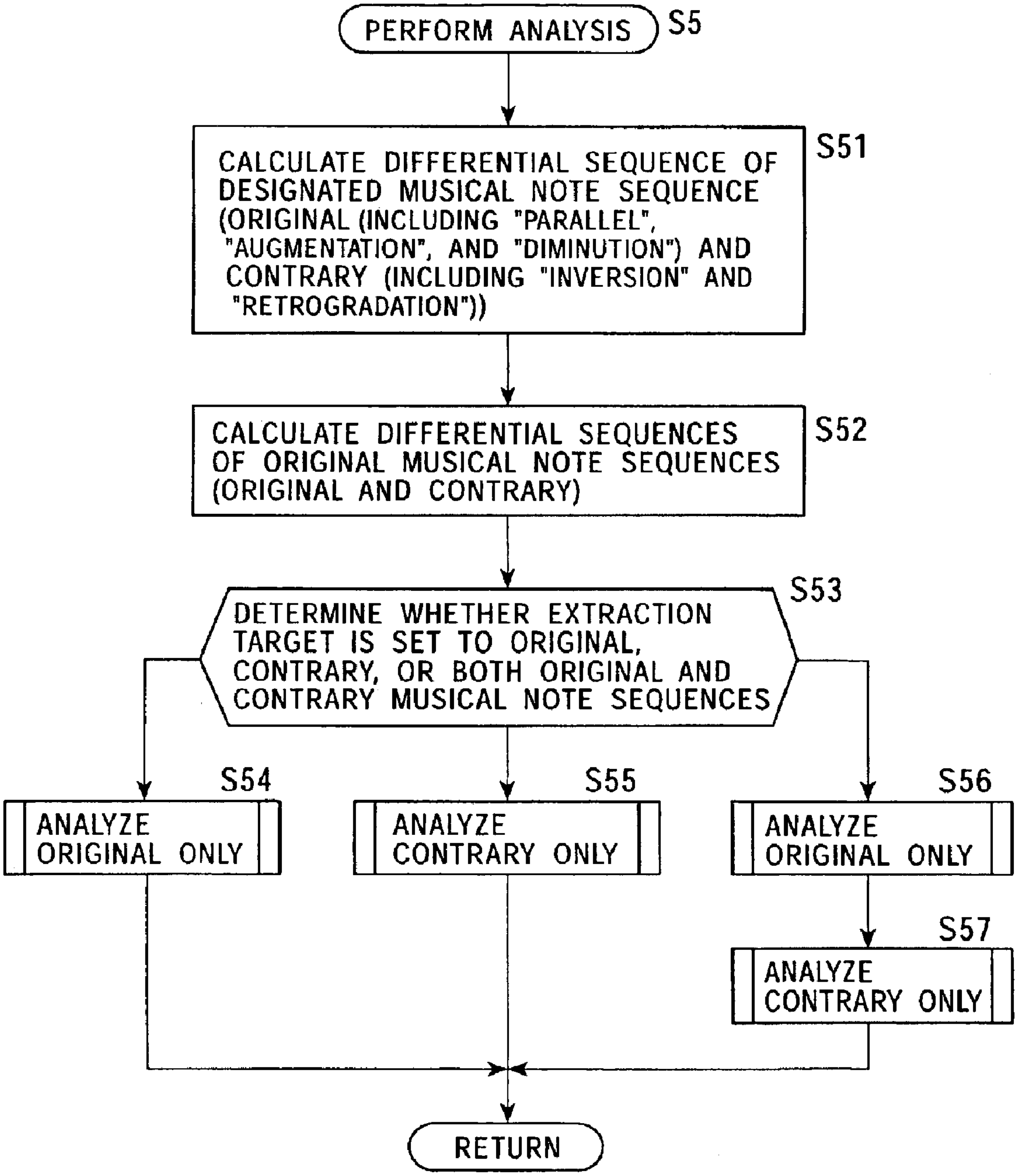
FIG. 3 is a flowchart showing a subroutine for a step for performing analysis in FIG. 2.

FIG. 3 shows a subroutine for performing analysis (step S5) in FIG. 2. In step S51, the designated musical note sequence designated by the musical note sequence designating means 2 is sent to the first differential sequence calculating means 3 that calculates the differential sequence of the designated musical note sequence. Here, the first differential sequence calculating means 3 calculates the differential sequence regardless of the selection in the designation field for "extraction target" 52 on the screen for "setting similarity" 51 shown in FIG. 11.

In step S52, the second differential sequence calculating means 4 calculates the differential sequences of the original musical note sequences in the electronic musical score data sent from the electronic musical score data reading means 1. The second differential sequence calculating means 4 also calculates the differential sequences regardless of the selection in the designation field for "extraction target" 52 on the screen for "setting similarity" 51 shown in FIG. 11.

In step S53, it is determined whether the target for analysis and extraction is set to the original musical note sequence, the contrary musical note sequence, or both the original and contrary musical note sequences in the designation field for "extraction target" 52 on the screen for "setting similarity" 51 shown in FIG. 11. If the target is set to the original musical note sequence, the process proceeds to step S54 and performs a subroutine shown in FIG. 4. If the target is set to the contrary musical note sequence, the process proceeds to step S55 and performs a subroutine shown in FIG. 5. If the target is set to both the original and contrary musical note sequences, the process proceeds to step S56 and performs the subroutine shown in FIG. 4. Then, the process proceeds to step S57 and performs the subroutine shown in FIG. 5. Step S56 and step S57 may be performed in reverse order.

Figure 4:
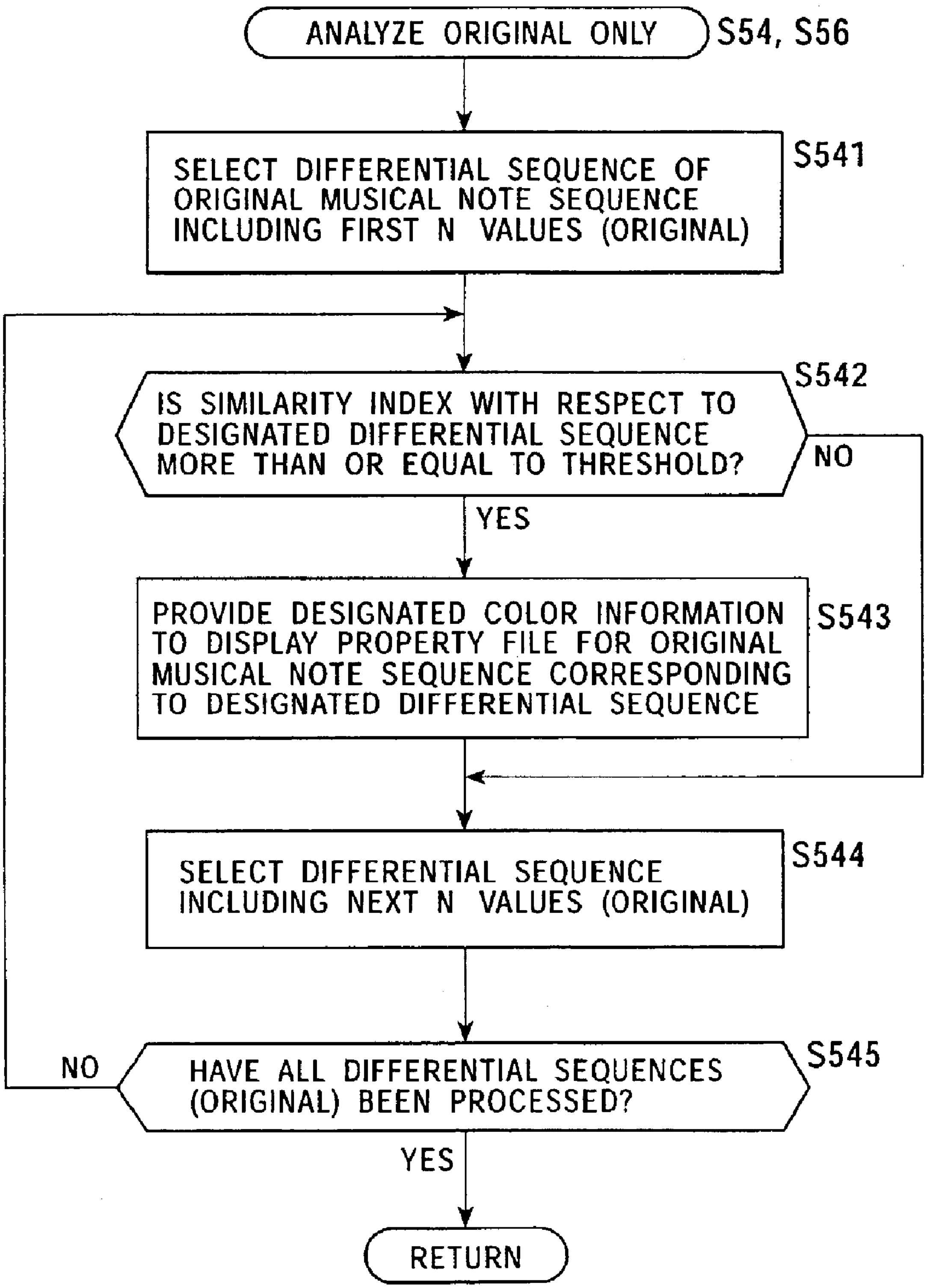
FIG. 4 is a flowchart showing a subroutine for a step for analyzing an original musical note sequence in FIG. 3.

FIG. 4 is a flowchart of a process in steps S54 and S56 shown in FIG. 3 for analyzing the original musical note sequence. In step S541, the differential sequences of the original musical note sequences in the electronic musical score data calculated in the second differential sequence calculating means 4 are sent to the musical note sequence extracting means 5 and the differential sequence including the first N values is selected. Here, "N" represents the number of values in the differential sequence of the designated musical note sequence. Referring to FIG. 10, there are seven values in the differential sequence of the designated musical note sequence. Thus, the differential sequence including the first seven values among the differential sequences of the original musical note sequences in the electronic musical score data is selected. Each note in the electronic musical score data written in MIDI format is expressed in a four-digit code of alphanumeric characters. The differential sequences are calculated by referring to a definition file including a table in which the four-digit code and the differential sequence correspond to each other.

In step S542, it is determined whether or not the similarity index between the differential sequence of the designated musical note sequence and the differential sequence including the N values selected in step S541 is more than or equal to the designated threshold. For example, the designated threshold is set to 50% in FIG. 11. If the similarity index is more than or equal to the threshold, the process proceeds to step S543. In step S543, addresses of the musical note sequence corresponding to the selected differential sequence including the N values and color information designated in the designation field for "color of similar musical note sequence" 54 shown in FIG. 11 are sent to the accessory information providing means 6, and the musical note addresses and the color information are written into the display property file so that they correspond to each other.

If the similarity index is less than the threshold in step S542 or if the processing in step S543 is terminated, the process proceeds to step S544. In step S544, the differential sequence including the next N values sent from the second differential sequence calculating means 4 is selected. The next N values means N values shifted by one value in the forward direction with respect to the previous N values. In step S545, it is determined whether or not all the original differential sequences have been processed. Steps S542 to S544 are repeated until the differential sequence including the last N values is processed.

Figure 5:
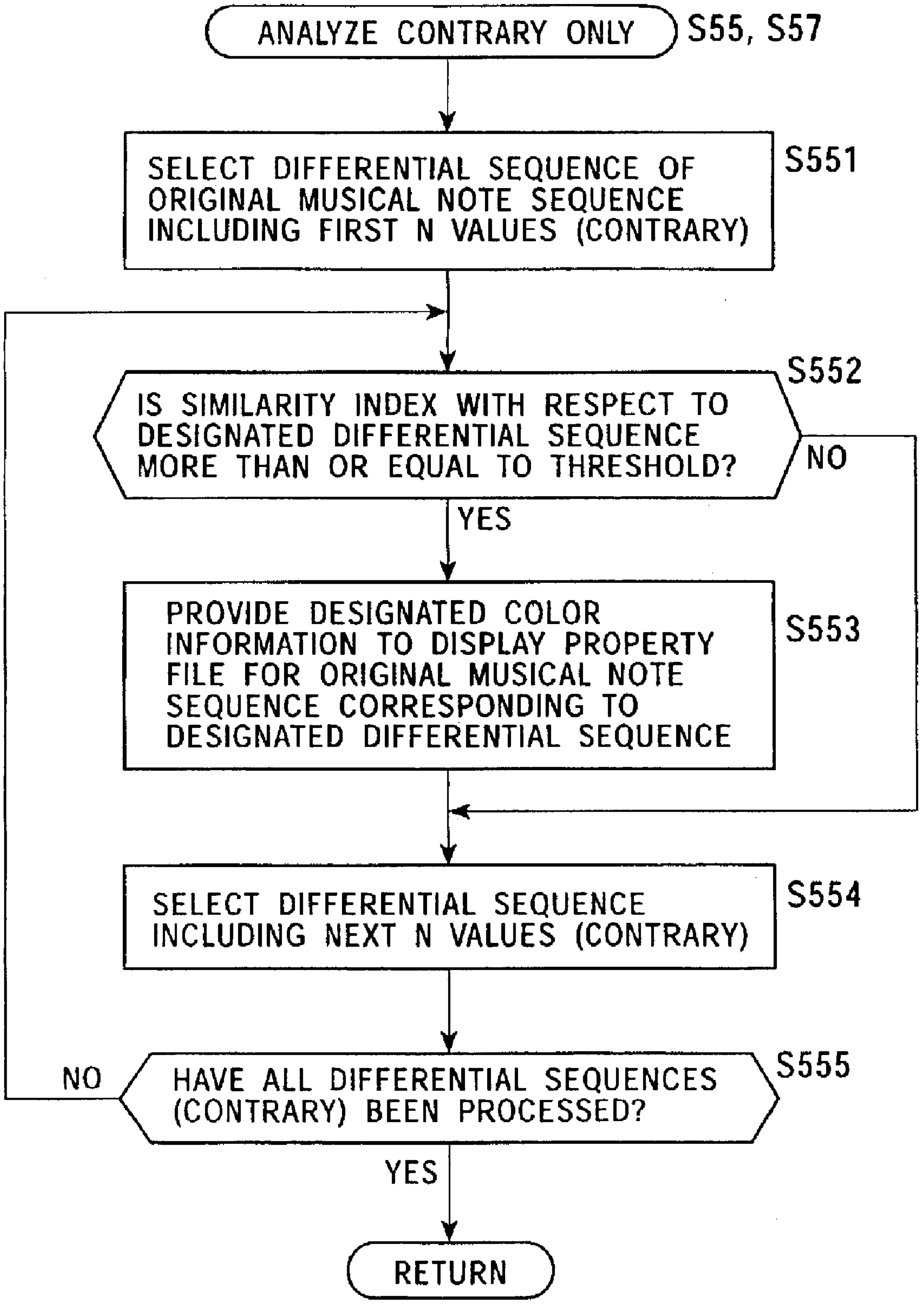
FIG. 5 is a flowchart showing a subroutine for a step for analyzing a contrary musical note sequence in FIG. 3.

FIG. 5 is a flowchart of a process in steps S55 and S57 shown in FIG. 3 for analyzing the contrary musical note sequence. In step S551, the differential sequences of the original musical note sequences in the electronic musical score data calculated in the second differential sequence calculating means 4 are sent to the musical note sequence extracting means 5 and the differential sequence including the first N values is selected. Here, "N" represents the number of values in the differential sequence of the designated musical note sequence, as described above. Referring to FIG. 10, there are seven values in the differential sequence of the designated musical note sequence. Thus, the differential sequence including the first seven values among the differential sequences of the original musical note sequences in the electronic musical score data is selected. Since the subroutine shown in FIG. 5 includes steps for extracting the contrary musical note sequence, each of the values in the-differential sequence selected in step S551 has a sign opposite to that in the differential sequence calculated in step S52 shown in FIG. 3.

In step S552, it is determined whether or not the similarity index between the differential sequence of the designated musical note sequence and the differential sequence including the N values selected in step S551 is more than or equal to the designated threshold. For example, the designated threshold is set to 50% in FIG. 11. If the similarity index is more than or equal to the threshold, the process proceeds to step S553. In step S553, addresses of the musical note sequence corresponding to the selected differential sequence including the N values and color information designated in the designation field for "color of similar musical note sequence" 54 shown in FIG. 11 are sent to the accessory information providing means 6, and the musical note addresses and the color information are written into the display property file so that they correspond to each other.

If the similarity index is less than the threshold in step S552 or if the processing in step S553 is terminated, the process proceeds to step S554. In step S554, the differential sequence including the next N values sent from the second differential sequence calculating means 4 is selected. The next N values means N values shifted by one value in the forward direction with respect to the previous N values. In step S555, it is determined whether or not all the contrary differential sequences have been processed. Steps S552 to S554 are repeated until the differential sequence including the last N values is processed.

Figure 6:
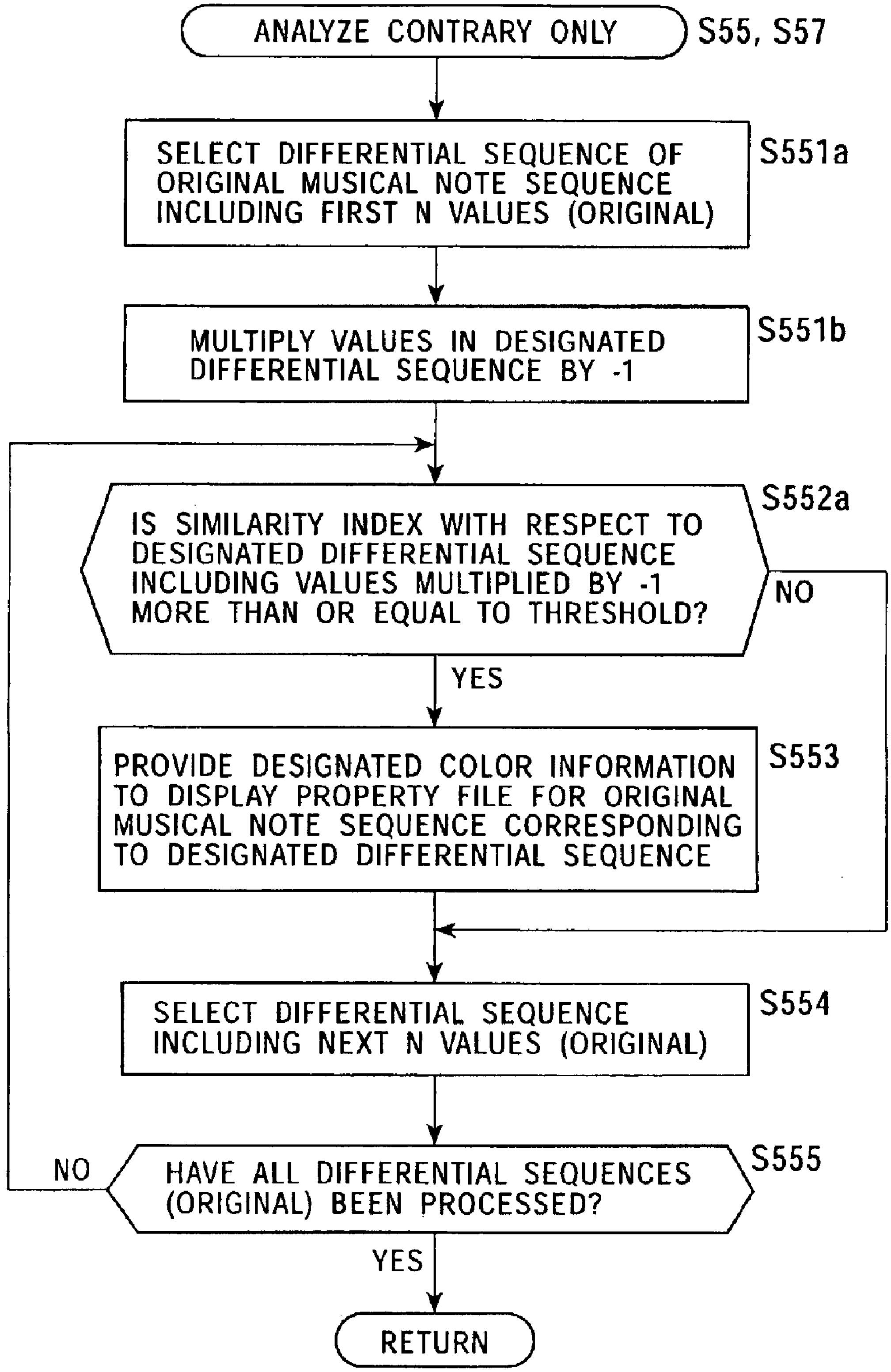
FIG. 6 is a flowchart showing a subroutine that is a modification of the step for analyzing the contrary musical note sequence in FIG. 3.

Steps S55 and S57 in FIG. 3 for analyzing the contrary musical note sequence can be performed as shown in FIG. 6.

FIG. 6 is a flowchart of a process that is a modification of the process in steps S55 and S57 shown in FIG. 3 for analyzing the contrary musical note sequence. In step S551*a*, the differential sequences of the original musical note sequences in the electronic musical score data calculated in the second differential sequence calculating means 4 are sent to the musical note sequence extracting means 5 and the differential sequence including the first N values is selected. In step S551*b*, each of the values in the differential sequence of the designated musical note sequence is multiplied by −1. In other words, the positive or negative signs of the respective values in the differential sequence of the designated musical note sequence are changed to the opposite ones.

In step S552*a*, it is determined whether or not the similarity index between the differential sequence of the designated musical note sequence, each value of which is multiplied by −1 in step S551*b*, and the differential sequence including the N values selected in step S551*a* is more than or equal to the designated threshold. For example, the designated threshold is set to 50% in FIG. 11. If the similarity index is more than or equal to the threshold, the process proceeds to step S553. In step S553, addresses for the musical note sequence corresponding to the selected differential sequence including the N values and color information designated in the designation field for "color of similar musical note sequence" 54 shown in FIG. 11 are sent to the accessory information providing means 6, and the musical note addresses and the color information are written into the display property file so that they correspond to each other.

If the similarity index is less than the threshold in step S552*a* or if the processing in step S553 is terminated, the process proceeds to step S554. In step S554, the differential sequence including the next N values sent from the second differential sequence calculating means 4 is selected. The next N values means N values shifted by one value in the forward direction with respect to the previous N values. In step S555, it is determined whether or not all the original differential sequences have been processed. Steps S552*a* to S554 are repeated until the differential sequence including the last N values is processed.

Referring now back to FIG. 3, if it is determined that both the original and contrary musical note sequences are selected as the target for analysis and extraction in step S53, both the analysis for the original musical note sequence shown in FIG. 4 and the analysis for the contrary musical note sequence shown in FIG. 5 or 6 are performed (steps S56 and S57).

Referring now back to FIG. 2, after terminating the analysis, the process proceeds to step S6. In step S6, the analyzed electronic musical score data is read. In the embodiment, the display property file created in the accessory information providing means 6 and the electronic musical score data read by the electronic musical score data reading means 1 are read so that they correspond to each other. It is determined whether or not the color information for the analyzed electronic musical score data is designated (step S7). It is determined whether or not there is a display property file (step S8). Then, the displaying means 7 displays the musical note in a color in accordance with the display property file in step S9. If there is no display property file available in step S8, the process proceeds to step S10 and a message "No display property file. Perform analysis if not analyzed." is displayed in the displaying means 7.

Figure 7:
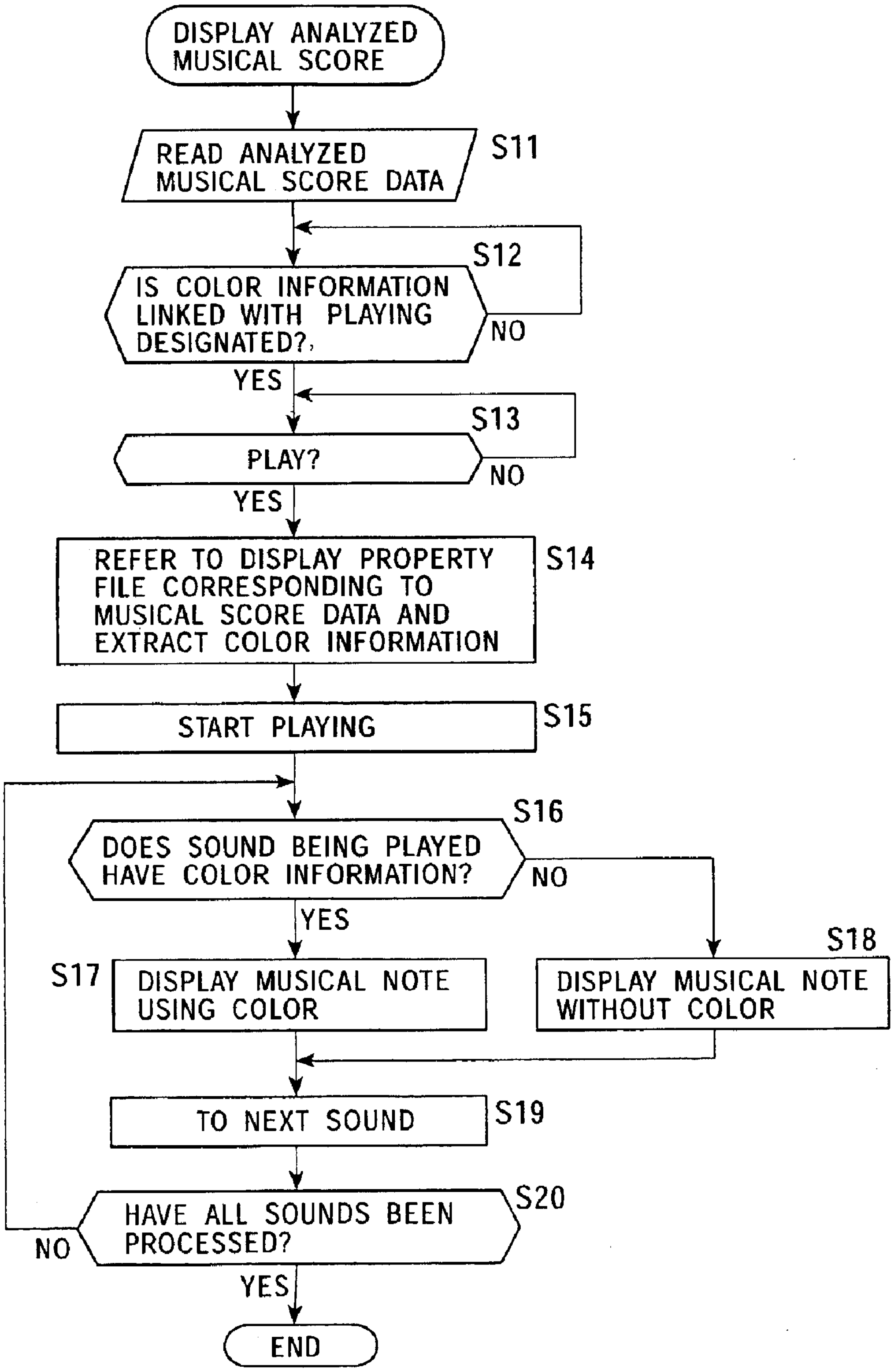
FIG. 7 is a flowchart showing a modification of steps S6 to S10 in FIG. 2.

FIG. 7 is a flowchart that shows the detailed steps corresponding to steps S6 to S9 shown in FIG. 2 and that shows a processing flow for the MIDI format data. In this analyzed musical note display processing, the analyzed electronic musical score data is read in step S11, and it is determined whether or not the color information linked with playing the electronic musical score data is designated (step S12). An instruction for playing is given in step S13, and the display property file corresponding to the electronic musical score data shown in FIG. 12 is referred to and the color information is extracted in step S14.

Playing of a sound is initiated in step S15, and it is determined whether or not the sound being played has color information (step S16). If the sound has color information, a musical note corresponding to the sound is displayed in a color in step S17. If the sound does not have color information, a musical note corresponding to the sound is displayed without color in step S18. Then, the next sound is processed in step S19. It is determined whether or not all the sounds have been processed in step S20. Then, the process of the above-described processing repeats until the last sound is processed.

Figure 14A:
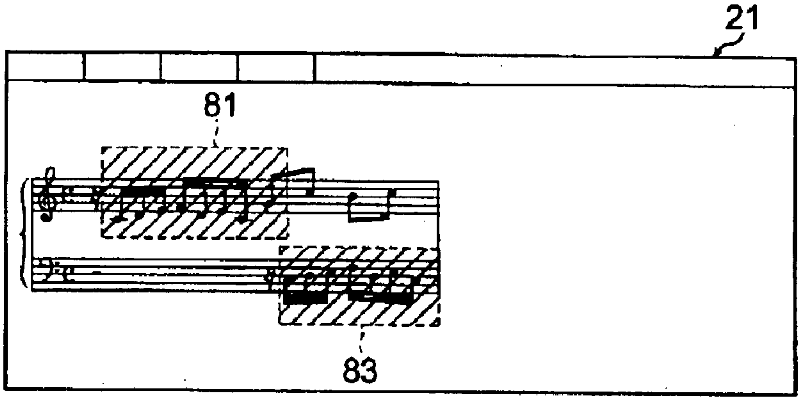
FIGS. 14A to 14C are illustrations of displaying states when the musical score displaying routine shown in FIG. 7 is performed.
Figure 14B:
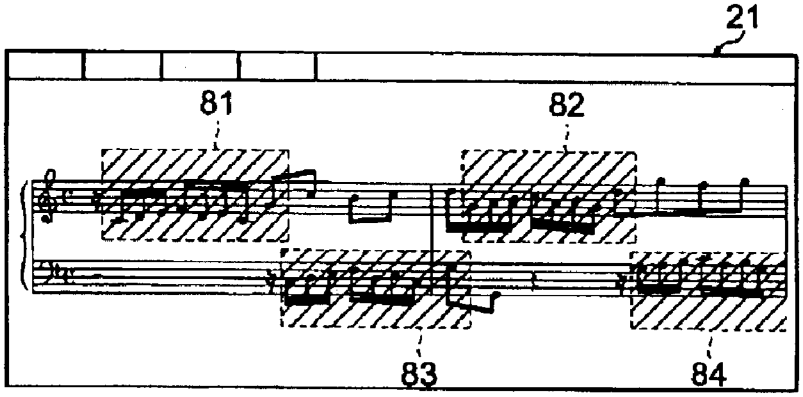
Figure 14C:
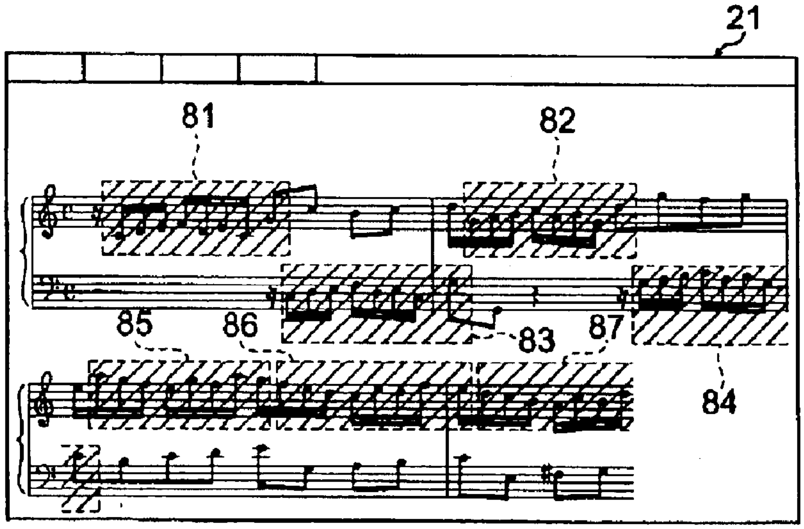

FIGS. 14A to 14C are illustrations showing the musical score for "Invention No. 1" by J. S. Bach shown in FIG. 8 that has been analyzed according to the embodiment and displayed on the display screen 21 by the above-described routine for the analyzed musical note display. These displays are shown in the order of FIGS. 14A, 14B, and 14C. For example, for the designated musical note sequence 81 shown in FIG. 8, a musical note sequence 83 that is an original musical note sequence is displayed in a color, as shown in FIG. 14A. Similarly, musical note sequences 85, 86, and 87 that are contrary to the designated musical note sequence 81 are also displayed in a color, as shown in FIG. 14C.

The embodiments described above have been explained so that the present invention is readily understood and are not intended to limit the present invention. In each element disclosed in the embodiments described above, all changes of design and equivalents are included in the technical scope of the present invention.

As described above, in accordance with the present invention, the musical note sequence highly correlated with the designated musical note sequence designated by the player is visually distinguishable from the other musical note sequences, thereby allowing the player to visually understand the structure of the entire musical piece. Consequently, the player's performance of the designated musical note sequence is improved, which causes the player's performance of the entire musical piece to be improved in a short period of time. In addition, for displaying the musical note sequence in different,colors, as shown in FIGS. 14A to 14C, if a plurality of themes or motifs overlap each other, in other words, even if one musical note belongs to a plurality of themes or motifs, the player can visually understand that the musical note belongs to the plurality of themes or motifs from the displayed musical note. For example, if one musical note belongs to two themes, an upper area and a lower area of the musical note can be displayed in different colors.

What is claimed is:

1. A computer-executable analysis program for analyzing an electronic musical score, said program being prepared for causing the computer to execute the steps comprising:

a reading step of reading electronic musical score data;

a first calculating step of calculating a designated differential sequence of a designated musical note sequence in the electronic musical score data;

a second calculating step of calculating differential sequences of original musical note sequences to be analyzed in at least part of the read electronic musical score data;

an extracting step of extracting a musical note sequence having a differential sequence with a predetermined similarity index with respect to the designated differential sequence of the designated musical note sequence from among the differential sequences of the original musical note sequences in the electronic musical score data; and a providing step of providing accessory information to visually distinguish the extracted musical note sequence from the other musical notes.

2. An analysis program for analyzing an electronic musical score according to claim 1, wherein the designated differential sequence of the designated musical note sequence includes a predetermined number of values, and the extracting step includes a determining step for selecting all the differential sequences including the predetermined number of values and for determining the respective similarity indexes for the selected differential sequences.

3. An analysis program for analyzing an electronic musical score according to claim 1, further comprising a displaying step of displaying the electronic musical score data and the accessory information on displaying means.

4. An analysis program for analyzing an electronic musical score according to claim 1, wherein the differential sequence includes data representing a musical interval between adjacent musical notes in the musical note sequence, the data being a value with a positive sign for a rising interval in which one note is higher than the previous note in the music playing direction and a value with a negative sign for a falling interval in which one note is lower than the previous note in the music playing direction.

5. An analysis program for analyzing an electronic musical score according to claim 4, wherein the similarity index is a correspondence rate of the designated differential sequence of the designated musical note sequence and each of the differential sequences of the original musical note sequences, and determination of whether or not the similarity index between the designated differential sequence of the designated musical note sequence and each of the differential sequences of the original musical note sequences meets the predetermined similarity index is based on whether or not the correspondence rate thereof is more than or equal to a designated threshold.

6. An analysis program for analyzing an electronic musical score according to claim 4, wherein the similarity index is a correspondence rate of values obtained by multiplying values in the designated differential sequence of the designated musical note sequence by −1 and values in each of the differential sequences of the original musical note sequences or a correspondence rate of the values in the designated differential sequence of the designated musical note sequence and values obtained by multiplying the values in each of the differential sequences of the original musical note sequences by −1, and determination of whether or not the similarity index between the designated differential sequence of the designated musical note sequence and each the differential sequences of the original musical note sequences meets the predetermined similarity index is based on whether or not the correspondence rate thereof is more than or equal to a designated threshold.

7. An analysis program for analyzing an electronic musical score according to claim 3, wherein the accessory information includes color information or tone information of the musical note or background of the musical note on the displaying means.

8. An analysis program for analyzing an electronic musical score according to claim 7, wherein, in the providing step, the accessory information is provided to at least one of the extracted musical note sequence and the other musical notes.

9. An analysis program for analyzing an electronic musical score according to claim 8, wherein the displaying step includes a color displaying step of displaying an area including the musical note sequence or the musical note provided with the accessory information in a color in accordance with the accessory information.

10. An analysis apparatus for analyzing an electronic musical score, comprising:

electronic musical score data reading means for reading electronic musical score data;

musical note sequence designating means for designating a designated musical note sequence in the electronic musical score data read by the electronic musical score data reading means;

first differential sequence calculating means for calculating a designated differential sequence of the designated musical note sequence;

second differential sequence calculating means for calculating differential sequences of original musical note sequences to be analyzed in at least part of the electronic musical score data read by the electronic musical score data reading means;

musical note sequence extracting means for comparing each of the differential sequences calculated in the second differential sequence calculating means with the designated differential sequence calculated in the first differential sequence calculating means and extracting a musical note sequence having a differential sequence with a predetermined similarity index;

accessory information providing means for providing the musical note sequence extracted in the musical note sequence extracting means with accessory information that is visually distinguishable from the other musical note sequences; and displaying means for displaying the thus processed electronic musical score data.

11. An analysis apparatus for analyzing an electronic musical score according to claim 10, wherein the designated differential sequence of the designated musical note sequence includes a predetermined number of values, and the musical note sequence extracting means selects all the differential sequences including the predetermined number of values and determines the respective similarity indexes for the selected differential sequences.

12. An analysis apparatus for analyzing an electronic musical score according to claim 10, wherein the differential sequence includes data representing a musical interval between adjacent musical notes in the musical note sequence, the data being a value with a positive sign for a rising interval in which one note is higher than the previous note in the music playing direction and a value with a negative sign for a falling interval in which one note is lower than the previous note in the music playing direction.

13. An analysis apparatus for analyzing an electronic musical score according to claim 12, wherein the similarity index is a correspondence rate of the designated differential sequence of the designated musical note sequence and each of the differential sequences of the original musical note sequences, and determination of whether or not the similarity index between the designated differential sequence of the designated musical note sequence and each of the differential sequences of the original musical note sequences meets the predetermined similarity index is based on whether or not the correspondence rate thereof is more than or equal to a designated threshold.

14. An analysis apparatus for analyzing an electronic musical score according to claim 12, wherein the similarity index is a correspondence rate of values obtained by multiplying values in the designated differential sequence of the designated musical note sequence by −1 and values in each of the differential sequences of the original musical note sequences or a correspondence rate of the values in the designated differential sequence of the designated musical note sequence and values obtained by multiplying the values in each of the differential sequences of the original musical note sequences by −1, and determination of whether or not the similarity index between the designated differential sequence of the designated musical note sequence and each of the differential sequences of the original musical note sequences meets the predetermined similarity index is based on whether or not the correspondence rate thereof is more than or equal to a designated threshold.

15. An analysis apparatus for analyzing an electronic musical score according to claim 10, wherein the accessory information includes color information or tone information of the musical note or background of the musical note on the displaying means.

16. An analysis apparatus for analyzing an electronic musical score according to claim 15, wherein the accessory information providing means provides the accessory information to at least one of the extracted musical note sequence and the other musical notes.

17. An analysis apparatus for analyzing an electronic musical score according to claim 16, wherein the displaying means displays an area including the musical note sequence or the musical note provided with the accessory information in a color in accordance with the accessory information.

18. An analysis method for analyzing an electronic musical score, comprising:

a designating step of designating a designated musical note sequence in electronic musical score data to be analyzed;

a first calculating step of calculating a designated differential sequence of the designated musical note sequence;

a second calculating step of calculating differential sequences of original musical note sequences in the electronic musical score data to be analyzed;

an extracting step of extracting a musical note sequence having a differential sequence with a predetermined similarity index with respect to the designated differential sequence of the designated musical note sequence from among the differential sequences of the original musical note sequences in at least part of the electronic musical score data to be analyzed; and a providing step of providing the extracted musical note sequence with accessory information that is visually distinguishable from the other musical note sequences.

* * * * *